Sept. 3, 1957     B. H. NICOLAISEN     2,805,254
PROCESS FOR THE PREPARATION OF PRIMARY AMINES
Filed Jan. 20, 1955
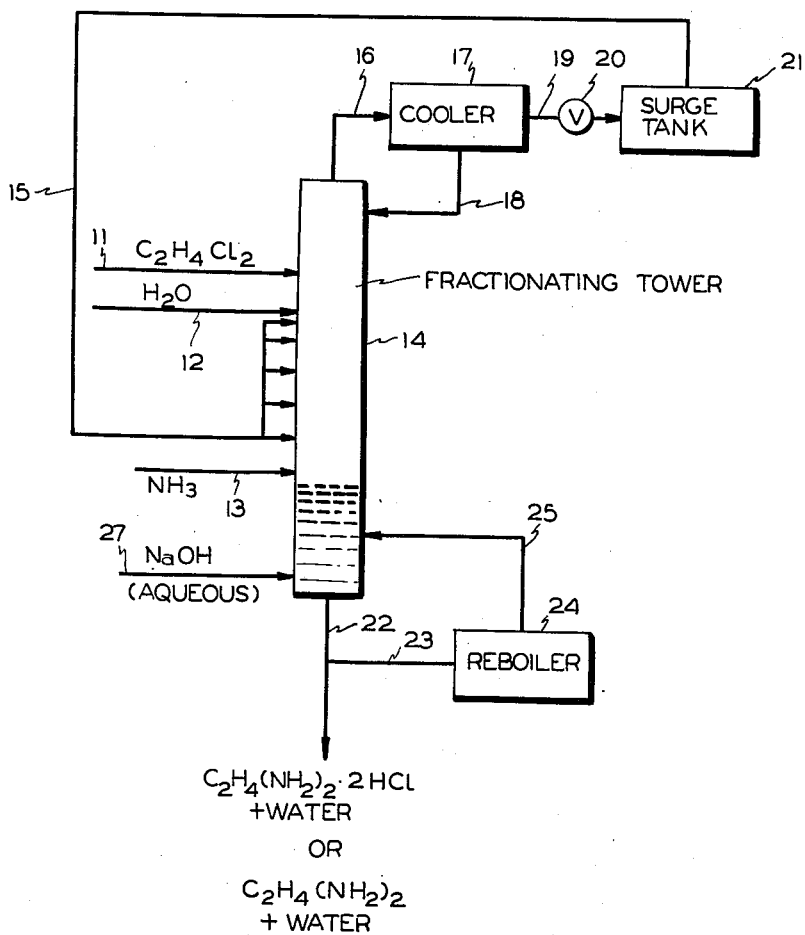
*INVENTOR*
BERNARD H. NICOLAISEN
BY Adams, Forward & McLean
*ATTORNEY*

United States Patent Office 2,805,254
Patented Sept. 3, 1957

2,805,254

PROCESS FOR THE PREPARATION OF PRIMARY AMINES

Bernard H. Nicolaisen, Kenmore, N. Y., assignor to Olin Mathieson Chemical Corporation, a corporation of Virginia Application January 20, 1955, Serial No. 482,917

6 Claims. (Cl. 260—585)

This invention relates to an improved process for the manufacture of primary aliphatic amines in which the formation of undesirable by-products is substantially suppressed and which is particularly useful in the manufacture of ethylene diamine.

The reaction of suitably reactive organic halides with ammonia to form the corresponding amines is well known and has been widely investigated. The reaction, although a simple one, is complicated by the formation of various undesirable by-products such as secondary amines, tertiary amines and quaternary ammonium compounds. It has been found that the formation of these undesirable by-products can be at least partially suppressed by employing an excess of ammonia in the reaction. This knowledge has not, however, provided the art with an entirely satisfactory solution to the problem of suppressing the formation of non-primary amine by-products due to the high vapor pressure of ammonia which has necessitated conducting the reactions in pressure vessels with resultant increased production costs. This difficulty has also been partially overcome by using water to reduce the vapor pressure of ammonia.

Although methods employing water and elevated pressures have been partially successful in suppressing the formation of non-primary amine by-products, it has still been necessary to strike an economic balance between the costs of recovering and recycling large volumes of ammonia and the alternative of producing less primary amine and more of the undesirable secondary and tertiary amines. The choice between these economically unattractive alternates has previously been unavoidable.

As a general rule, the ratio of ammonia to organic halide has been sufficiently low to avoid excessive recycle costs and yet high enough to produce adequate yields of primary amine without the formation of excessive amounts of the less valuable by-products. In the production of ethylene diamine, for example, a ratio of ammonia to chloride of from 5:1 to 15:1 has been commonly employed according to Groggins, "Unit Processes in Organic Syntheses." These ratios of ammonia to chloride, although as high as generally practicable in known processes, result in the formation of relatively large quantities of undesirable by-products having a lower economic value than ethylene diamine, e. g., diethylene triamine, triethylene tetramine and higher polyethylene polyamines.

The present invention provides a method for the production of primary aliphatic amines in which the formation of undesirable by-product amine compounds is substantially suppressed due to the maintenance of a very high ratio of ammonia to aliphatic chloride in the reaction zone. The new process, although widely applicable in the preparation of aliphatic amines, is particularly useful in preparation of ethylene diamine and provides a method for producing this compound with substantially no production of the undesirable polyethylene polyamines. This desirable result is accomplished while maintaining the cost of recycling ammonia within reasonable limits.

The process of the present invention comprises charging a suitable aliphatic halide, water and ammonia to a vertical reaction zone which in practice can be a conventional fractionating tower. The reaction zone is maintained under suitable conditions of pressure and temperature to condense substantially all of the excess ammonia passing overhead with the result that the ammonia is returned totally as reflux to the upper portion of the reaction zone or optionally, the ammonia can be recycled to lower portions of the zone as well. The reaction of the aliphatic halide with ammonia occurs in the central portion of the reaction zone or fractionating tower. The effluent from the lower portion of the reaction zone comprises an aqueous solution of the primary amine product, usually in the form of its hydrohalide salt. Suitable temperatures are maintained in the lower portion of the reaction zone to free the aqueous solution present at that point from excess ammonia and aliphatic halide, thus returning the reactants to the central portion of the reaction zone or fractionating tower and providing an aqueous product containing effluent free from dissolved reactants. Since ammonia is always the most volatile substance in the system, it is possible to retain the aliphatic halide reactant in the central portion of the reaction zone by refluxing ammonia in the upper portion of the zone. Therefore, by maintaining suitable temperatures in the upper and lower portions of the reaction zone, the reactants are concentrated in the central portion of the zone making it possible to maintain at that point a very high ratio of ammonia to aliphatic halide. This effectively suppresses the formation of the undesirable by-products referred to above, thus providing for the production of a primary aliphatic amine in an economical and efficient manner.

The process can be operated in a batch or continuous manner. When operated continuously, the ratio of make-up ammonia to aliphatic halide charged to the tower may be substantially theoretical once the unit is in operation. The fresh charge is chemically equivalent to the amount of amine product solution removed from the lower portion of the reaction zone or fractionating tower, e. g., when one pound mole per minute of ethylene diamine dihydrochloride is removed as an aqueous solution from the lower portion of the reaction zone, one pound mole of ethylene dichloride and two pound moles of ammonia per minute are charged as make-up to the reaction zone. The superiority of the new process to those of the prior art is obvious when it is considered that reaction of stoichiometric proportions of aliphatic halide and ammonia would ordinarily produce substantial amounts of the undesirable by-products and commercially inadequate yields of the desired primary amines. For example, when ethylene dichloride and ammonia are reacted in theoretical proportions, polyethylene polyamines are formed as principal products and relatively little of the desired product, ethylene diamine is obtained. In the present process, however, due to the fractionation which takes place in the reaction zone, the reaction occurs in the presence of an extremely high ratio of ammonia to ethylene dichloride and, therefore, satisfactory yields of ethylene diamine are obtained with substantially no formation of polyethylene polyamines.

The heat of reaction is usually sufficient to maintain an adequate reaction temperature in the central portion of the reaction zone so that no additional heat is ordinarily required at this point. Any excess heat which is generated by the reaction may be removed by cooling and condensing the ammonia overhead and refluxing or recycling the cooled ammonia to the reaction zone. If necessary, heat may be supplied to the lower portion of the reaction zone or fractionating column or to a separate stripper section to insure the removal of dissolved aliphatic halide and ammonia from the effluent aqueous product bearing solution.

Water is charged to the reaction zone in an amount sufficient to maintain all of the reaction products in aqueous solution. Suitable holding times are automatically provided in the new method by controlling the product take-off rate and the reactant charge rate.

The temperatures and pressures which are suitable for use in the new process vary depending upon the aliphatic halide employed in the reaction. Ordinarily, temperatures of about 30 to 40° C. in the upper portion of the reaction zone or fractionating tower and from about 100 to 200° C. in the lower portion of the reaction zone are suitable. Suitable pressures include those from about atmospheric to about 300 pounds per square inch or more.

In a modification of the new process, part of the water charged to the reaction zone may carry with it a suitable proportion of a soluble non-volatile alkali provided that the alkali is charged to the reaction zone at a point below that at which appreciable quantities of aliphatic halides are present. Although any water soluble non-volatile alkali may be used, sodium hydroxide is preferred because of its low cost and ready availability. Some water is ordinarily charged to the reaction zone at a higher point in order to depress the vapor pressure of ammonia and insure the solution of the amine hydrohalide product. Charging the aqueous alkali to the reaction zone or fractionating tower at a point below that at which substantial amounts of halide are present avoids hydrolysis of the aliphatic halide and converts the amine hydrohalide product and any ammonium halide present to the free amine or ammonia and sodium halide. The relatively volatile ammonia thus liberated is returned to the central portion of the reaction zone as described above.

Water and sodium chloride are of much lower volatility than any of the other substances present in the system described above and are, therefore, easily removed from the lower portion of the reaction zone as an aqueous solution. The introduction of alkali produces additional heat in the reaction zone and liberates this heat at the point of maximum usefulness. In the modification of the new process in which no alkali is introduced into the reaction zone, the effluent aqueous solution contains a primary amine hydrohalide which may be neutralized separately. This method wastes the heat of neutralization. The primary amine product may be removed from the aqueous salt solution, obtained as described above, as an azeotrope with water or as the anhydrous amine by conventional methods.

The process of the present invention is useful for the ammoniation of aliphatic halides where the water azeotrope of the halide to be converted has a boiling point above that of ammonia (−33° C. at standard conditions) and below the boiling point of water. In the modification of the present invention in which a water soluble non-volatile alkali is employed, suitable aliphatic halides are those which form water azeotropes distilling at temperatures below that at which the water azeotrope of the amine corresponding to the halide has a substantial vapor pressure. In other words, alkali may be used only with aliphatic halides whose water azeotropes have relatively low boiling points, whereas in the modification of the present invention in which no alkali is employed, aliphatic halides which form water azeotropes boiling at relatively high temperatures but still below the boiling point of water may be used since the product is obtained in the form of the relatively less volatile primary amine hydrohalide.

In general then, it is necessary to select aliphatic halide reactants which can be volatilized from an aqueous solution containing the product without volatilizing significant amounts of the product. The product is removed from the reaction zone immediately after formation as an aqueous solution which is then subjected, in the lower portion of the reaction zone, to a temperature sufficiently high to remove dissolved aliphatic halide from the solution. In this way, contact of product and reactants is kept to a minimum and the formation of undesirable by-products such as secondary and tertiary amines and the like is minimized.

Aliphatic halides which are suitable for use in the modification of the process of this invention in which a water soluble non-volatile alkali is employed to obtain an aqueous primary amine solution as a bottoms product include methyl chloride, ethyl chloride, and ethylene dichloride and the like. The water azeotropes of the aliphatic halides of this category have boiling points which are sufficiently lower than those of the water azeotropes of the corresponding primary amines to make separation of the reactant halide from the aqueous product bearing solution relatively easy. Temperatures in the reaction zone are generally low so that longer reaction times are ordinarily required for these volatile halides.

Certain higher boiling aliphatic halides may also be used when alkalies are employed. These include, for example, propylene dichloride and n-butyl chloride. The former boils at 96.8° C. at atmospheric pressure but steam distills from an aqueous solution substantially completely while propylene diamine which boils at 120° C. is largely retained in the aqueous solution. In like manner, n-butyl chloride and n-butyl amine boil at 77.5° C. and 77° C. respectively, but the former is readily volatilized with water vapor while the n-butyl amine has a relatively low vapor pressure in aqueous solution.

Certain other aliphatic halides which are useful in the process of the present invention have boiling points which are too high to allow the use of alkali. These halides which include trimethylene chloride, ethyl bromide, methyl iodide, cyclopropyl chloride and the like may be steam distilled from an aqueous solution containing an amine hydrohalide and are, therefore, useful in the modification of the present invention in which no alkali is employed.

Although the process of the present invention is generally applicable to the preparation of any organic primary amine by the reaction of a suitable halide and ammonia, it is generally used for the preparation of aliphatic primary amines. Halogen atoms attached directly to aromatic nuclei are usually too unreactive to make the preparation of primary aromatic amines feasible by the method of this invention. Further, aromatic compounds containing halogen atoms sufficiently reactive because of their position in aliphatic side chains or due to the presence of activating nuclear substituents are also unsuitable since these compounds are usually too high boiling for use in an aqueous system. On the other hand, although most fluorocarbons are insufficiently reactive for conversion by the present process, such compounds containing a more reactive halogen atom may be used with advantage. For example, 2,2,2-trifluoro-1-chloroethane yields 2,2,2-trifluoroethylamine.

The invention will be further illustrated by reference to the attached flow sheet.

Ethylene dichloride, water and ammonia are introduced by lines 11, 12 and 13 respectively to fractionating tower 14 which may be of the bubble cap or packed type. Recycle ammonia, if used, is also introduced to the tower at one or many points by line 15. The heat of reaction generated in the tower serves to evaporate ammonia and ethylene dichloride which are fractionated, ammonia passing overhead via line 16 and ethylene dichloride remaining in the mid-portion of the tower. Ammonia is liquefied in cooler 17 and either totally or partly returned to the tower as reflux by line 18. The remaining ammonia flows through line 19 controlled by valve 20 to surge tank 21 and is recycled to the tower via line 15. The ratio of ammonia used for reflux and for recycle is controlled by valve 20. Water and ethylene diamine dihydrochloride pass downwardly in the tower vaporizing ethylene dichloride therefrom and returning it to the mid-portion of the tower. The bottoms, free of ammonia and ethylene dichloride, are removed through line 22 and in part pass by line 23 to reboiler 24, returning vapors by line 25 to the bottom of the tower. The product, ethylene diamine dihydrochloride in aqueous solution, is removed by line 26.

In the alternative procedure in which the base is liberated by means of caustic soda, the latter may be charged in aqueous solution by a line 27 entering the tower 14 at a point below the inlet line 13 for make-up ammonia. The bottoms product then comprises an aqueous solution of sodium chloride and ethylene diamine from which the latter may be recovered in any known manner.

The invention will be further illustrated by reference to the following example:

In an operation similar to that shown in the attached figure, with the exception that the inlet lines to the tower are modified by vertical adjustment thereof and in which the tower is about 35 feet in height and 0.25 square feet in cross-sectional area, 100 pounds per hour of ethylene dichloride is charged through a line entering the fractionating tower just below the top plate. Fresh anhydrous ammonia enters the tower at the rate of 35 pounds per hour through a line located about one-third of the distance above the bottom of the fractionating tower. A line located about one-fifth of the height of the column from the bottom carries 200 pounds per hour of 40% caustic. A line located at about the level of the second plate from the top of the fractionating tower carries 315 pounds per hour of additional water. Heat is supplied by the reaction of the ethylene dichloride, ammonia and caustic in the fractionating tower and additional heat is introduced in the reboiler. The liquid and vapor in equilibrium on the top plate are substantially anhydrous ammonia. Under a pressure of 225 p. s. i. g., ammonia gas is removed from the top of the tower at about 38° C. It is taken overhead at a rate of about 568 pounds per hour to the cooler which reduces the temperature of the liquid to about 35° C. About half of the ammonia is returned to the top plate of the tower as reflux and about half is returned through a surge tank to the reaction zone of the tower at about the mid-point thereof. The ratio of ammonia to ethylene dichloride is about 33:1. The liquid level in the bottom of the tower is just sufficient to maintain liquid feed to the reboiler. The bottoms leave the tower at a temperature of about 140° C. and comprise an aqueous solution of about 9% of ethylene diamine and 18% of sodium chloride. Ethylene diamine can be separated therefrom by distillation or other suitable means.

I claim:

1. A process for the production of primary aliphatic amines in which the formation of undesirable by-product amine compounds is substantially suppressed which comprises reacting an aliphatic halide which forms a water azeotrope boiling in the range extending from the boiling point of ammonia to the boiling point of water with ammonia in the central portion of a vertical reaction zone, charging water to said zone at a point above the central portion thereof whereby the primary aliphatic amine hydrohalide reaction product is dissolved and removed as an aqueous solution from the central portion to the lower portion of said zone, distilling dissolved reactant ammonia and aliphatic halide from said aqueous solution in the lower portion of said zone, thus returning reactants to the central portion of said zone, refluxing ammonia in the upper portion of said zone, and recovering an aqueous primary aliphatic amine hydrohalide solution from the lower portion of said zone.

2. A process for the production of primary aliphatic amines in which the formation of undesirable by-product amine compounds is substantially suppressed which comprises reacting an aliphatic halide with ammonia in the central portion of a vertical reaction zone, the water azeotrope of said aliphatic halide having a boiling point which is less than the boiling point of the water azeotrope of the primary aliphatic amine corresponding to said aliphatic halide and less than the boiling point of water but greater than the boiling point of ammonia, charging water to said zone at a point above the central portion thereof whereby the primary aliphatic amine hydrohalide reaction product is dissolved and removed as an aqueous solution from the central portion to the lower portion of said zone, charging a water soluble non-volatile alkali to the reaction zone below the central portion of said zone at a point where said alkali will not come in contact with substantial concentrations of the reactants thus converting said hydrohalide reaction product in said aqueous solution in the lower portion of said zone to the free amine, distilling dissolved reactant ammonia and aliphatic halide from said aqueous solution in the lower portion of said zone, thus returning reactants to the central portion of said zone, refluxing ammonia in the upper portion of said zone, and recovering an aqueous primary aliphatic amine solution from the lower portion of said zone.

3. The process of claim 2 in which the water soluble non-volatile alkali is sodium hydroxide.

4. A process for the production of ethylene diamine in which the formation of undesirable by-product amine compounds is substantially suppressed which comprises reacting ethylene dichloride with ammonia in the central portion of a vertical reaction zone, charging water to said zone at a point above the central portion thereof whereby the ethylene diamine dihydrochloride reaction product is dissolved and removed as an aqueous solution from the central portion to the lower portion of said zone, distilling dissolved reactant ammonia and ethylene dichloride from said aqueous solution in the lower portion of said zone thus returning reactants to the central portion of said zone, and recovering an aqueous solution of ethylene diamine dihydrochloride from the lower portion of said zone.

5. A process for the production of ethylene diamine in which the formation of undesirable by-product amine compounds is substantially suppressed which comprises reacting ethylene dichloride with ammonia in the central portion of a vertical reaction zone, charging water to said zone at a point above the central portion thereof whereby the ethylene diamine dihydrochloride reaction product is dissolved and removed as an aqueous solution from the central portion to the lower portion of said zone, charging a water soluble non-volatile alkali to the reaction zone below the central portion of said zone at a point where the alkali will not come in contact with substantial concentrations of the reactants thus converting said ethylene diamine dihydrohalide reaction product in said aqueous solution in the lower portion of said zone to the free amine, distilling dissolved reactant ammonia and ethylene dichloride from said aqueous solution in the lower portion of said zone thus returning reactants to the central portion of said zone, and recovering an aqueous solution of ethylene diamine from the lower portion of said zone.

6. The process of claim 5 in which the water soluble non-volatile alkali is sodium hydroxide.

References Cited in the file of this patent

UNITED STATES PATENTS 1,832,534    Curme, Jr. et al. _____ Nov. 17, 1931